United States Patent [19]
Reed et al.

[11] Patent Number: 5,634,206
[45] Date of Patent: May 27, 1997

[54] METHOD AND APPARATUS FOR ESTIMATING A SIGNAL FADING CHARACTERISTIC

[75] Inventors: John D. Reed, Arlington; Frank P. O'Neill, Richland Hills; Benjamin T. The, Ft. Worth, all of Tex.

[73] Assignee: Motorola, Inc., Schaumburg, Ill.

[21] Appl. No.: 450,326

[22] Filed: May 25, 1995

[51] Int. Cl.$^6$ ............................................. H04B 1/16
[52] U.S. Cl. .................... 455/277.1; 455/33.2; 455/52.1; 455/135
[58] Field of Search ................... 455/52.1, 52.3, 455/133–136, 140, 277.1, 277.2, 33.1, 33.2

[56] References Cited

U.S. PATENT DOCUMENTS

| | | | |
|---|---|---|---|
| 5,140,695 | 8/1992 | Yasuda et al. | 455/238.1 X |
| 5,163,163 | 11/1992 | Sato | 455/134 |
| 5,239,667 | 8/1993 | Kanai . | |
| 5,379,449 | 1/1995 | Porambo | 455/52.3 |
| 5,396,645 | 3/1995 | Huff | 455/134 X |

FOREIGN PATENT DOCUMENTS

WO94/18756  8/1994  WIPO .

*Primary Examiner*—Chi H. Pham
*Attorney, Agent, or Firm*—Bruce Terry

[57] ABSTRACT

A method and apparatus for measuring a characteristic of a fading signal received using a two or more branch diversity receiver is presented. This fading characteristic is generally proportional to the speed of the user. In a first embodiment the number of times the antenna branches change in a selection diversity process is counted, and the result is scaled for imbalance between the branches. The output of a fading quality estimator, indicative of the fading and generally proportional to the speed, is thereby obtained.

19 Claims, 3 Drawing Sheets

METHOD AND APPARATUS FOR ESTIMATING A SIGNAL FADING CHARACTERISTIC

FIELD OF THE INVENTION

The present invention relates, in general, to communication systems and, more particularly, to a method and apparatus for determining the fading characteristic of a signal received at a communication unit in a communication system.

BACKGROUND OF THE INVENTION

In a communication system such as Cellular or PCS (Personal Communications Services) systems, signals are transmitted between base stations and subscribers using an RF (radio frequency) carrier. There are many propagation effects that will affect such signals in urban, suburban and rural environments, and these include multipath and log normal fading mechanisms. There are also many methods to improve the quality of a received signal, including the use of high gain antennas, handoff between cells (macro-diversity), and diversity reception with two or more antennas at a base station or subscriber (micro-diversity). Generally, handoff between cells produces improvement to log normal or shadow fading, i.e. that fading produced by signal interactions from obstructions or blockages that reduce the effective coverage of the cell.

Multipath or fast fading is produced by the random scattering of radio signals in a cluttered environment in which the signals reflecting and diffracting from a variety of surfaces relatively near the receiver combine at the antenna of the receiver forming a Rayleigh or Rician signal fading profile. Generally, to combat multipath, two antennas are used, spaced apart enough to obtain nearly independent samples of the multipath faded signals (e.g., signals 10 and 11 of FIG. 1) and these signals are applied to a diversity receiver. Common types of diversity include switched, selection, equal gain, and max ratio combining, and generally require two or more antennas which are separated in space or polarization.

One goal of using diversity receive antennas is to reduce the degrading effect of the large variations in signal strength characteristic of multipath fading by selecting the best antenna for reception, until another antenna becomes better. The effect of this is that the active antenna (i.e., currently in use) will be continually changing since the motion of the user or the environment will cause the absolute signal level on each antenna to change, e.g. as shown by signals 10 and 11 in FIG. 1. Both the motion of the subscriber and the motion of the environment (i.e. vehicles and pedestrians in motion, trees moving in the wind, etc.) will produce variations in the instantaneous signals seen at each antenna. In fact, a user might be stationary, and the signal could still exhibit dynamic multipath fading due to the motion around the user. Environmentally induced fluctuations in the multipath signal can generally be considered to have the same effect as signal fluctuations caused by the subscriber's movement since approximately the same receiver degradation due to signal fading would occur.

While the use of diversity does improve the quality of signal reception, it accomplishes this improvement using signal strength information, but typically not any specific information about the characteristics of the fading channel and environment. Some prior approaches have attempted to derive such information, but these have been measurements off a single branch (e.g., counting zero crossings and using slope detection) with some degree of complexity in additional circuitry being required. Such determinations have been limited in their quality, and subject to inaccuracies (e.g., when a branch goes into a deep fade).

Finally, the beneficial effects of diversity will be at their maximum when there is no branch imbalance between the paths to the two antennas. This means that when each antenna receives the same average power, as averaged over approximately 20 wavelengths in a scattered environment, the branches are said to be balanced. When the two paths or branches are not balanced, i.e. if there is extra attenuation in one path due to an obstruction, or blockage, or due to polarization effects, etc., then the benefit from diversity is reduced. This is illustrated by FIG. 2, where signal 20 is received with substantial attenuation with respect to signal 21.

A need, therefore, remains for an improved method for estimating characteristics of a fading signal, including those indicative of subscriber speed, while minimizing system complexity and cost, and preferably considering branch imbalances and other known factors.

DETAILED DESCRIPTION OF THE DRAWINGS

These and other needs are met by the improved method and apparatus of the invention. Thus, in a first embodiment of the invention, a diversity receiver records the rate of change of the selection of receive antennas for the communication unit. From this rate a fading signal characteristic, e.g., a value generally proportional to the apparent speed (due to subscriber motion and/or environmental motion) can be determined. The fading signal characteristic can be additionally calculated using fade rate information which is characteristic of the multipath environment for the given carrier frequency. Since this rate of change is affected by branch imbalance, making it difficult to use directly for typical mobile units since small changes in the average level between the branches could introduce significant errors in the speed estimate, the branch imbalance is preferably estimated and used to scale the number obtained from the rate of change of antennas at the receiver. By incorporating these methods, an improved fading characteristic or fading quality measure is obtained, even for large variations in branch imbalance.

It should be noted that the fading quality measure/ characteristic can be used for many purposes. Since most of these purposes do not rely upon differentiation between a subscriber in motion and the environment (either fixed or moving objects) the fading quality measure can be used to significantly improve overall system performance. Examples of these purposes include the selection of averaging time from which to calculate system parameters such as handoff decisions, adjusting sampling intervals, power control adjustements, updating neighbor lists, optimizing message rates, etc. Therefore, even if the environment is moving and the subscriber is still, a fading quality measure is still quite useful. In cases where there is little clutter near the subscriber, there may be instances when the signal level is very consistent, and little fading is seen. In this case, the fading quality measure being used as a speed estimate, by the nature of its derivation, could underestimate the speed of the user. However in this case, the system parameters associated with the speed determination would be properly accounted for since the signal quality would be characteristic of the speed estimated by the fading quality measure. If subscriber location were known, such accounting can be accomplished by applying an offset factor for known (e.g., pre-measured) characteristics of reception at that location.

Figure 1:
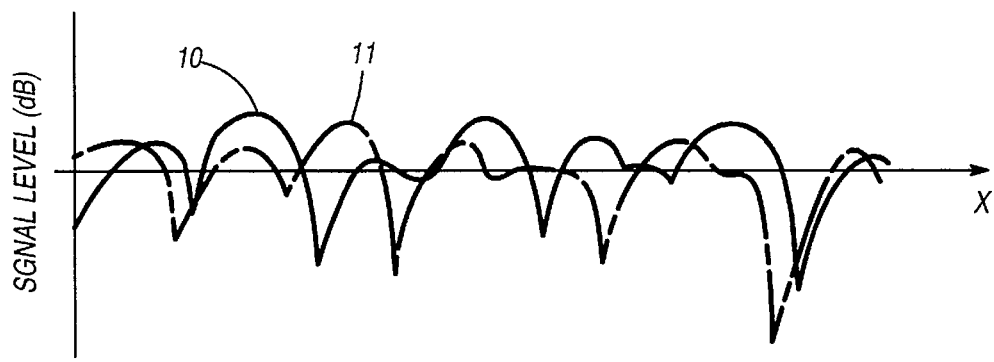
FIG. 1 is an illustrative prior art plot of Rayleigh fading signals illustrating typical signal levels recorded by two uncorrelated receiving antennas with approximately equal average power in each branch.

A simple method and apparatus for estimating the signal fading characteristic/quality is described using a selection diversity receiver with reference to FIG. 1. A selection diversity receiver, described herein, is one in which two or more receiver branches are compared periodically (e.g. a digital receiver) and the best branch is selected for reception of the transmitted message in each period ($T_{div}$). The diversity period, $T_{div}$, should be suitably short enough to react quickly to multipath fluctuations and make a branch decision while the decision is still valid.

Other types of selection diversity receivers (e.g., AMPS (Advanced Mobile Phone Service) cellular base receivers) perform continuous comparison of diversity branches. In these analog selection diversity receivers, $T_{div}$ is limited by branch switching speed or by software, and the maximum antenna transition rate is generally determined by the speed of the multipath fluctuation. Still other receivers (e.g. TDMA (time division multiple access) subscribers proposed by Bellcore and original AMPS mobiles) use switched diversity schemes where there are two antennas but only one receiver. In the case of switched diversity receivers, antennas can be, e.g., sampled periodically before the reception of each burst, or an algorithm can be used to switch to the unconnected antenna once performance through the connected antenna falls below some quality threshold (original AMPS mobiles) (both approaches being illustrated in FIG. 3 by the coupling of diversity decision unit 118 to either the front-end receivers 111, 116 or back-end receiver 130). In a periodic switched diversity receiver, such as in some TDMA systems, diversity performance could be thought of as pseudo-selection diversity if the branch sampling period ($T_{div}$) is short compared to the fluctuation time of the multipath signal. Thus, a selection diversity receiver can be used to model the performance of a fading quality estimator for a switched diversity receiver (with suitably fast decisions), and vice versa.

Figure 3:
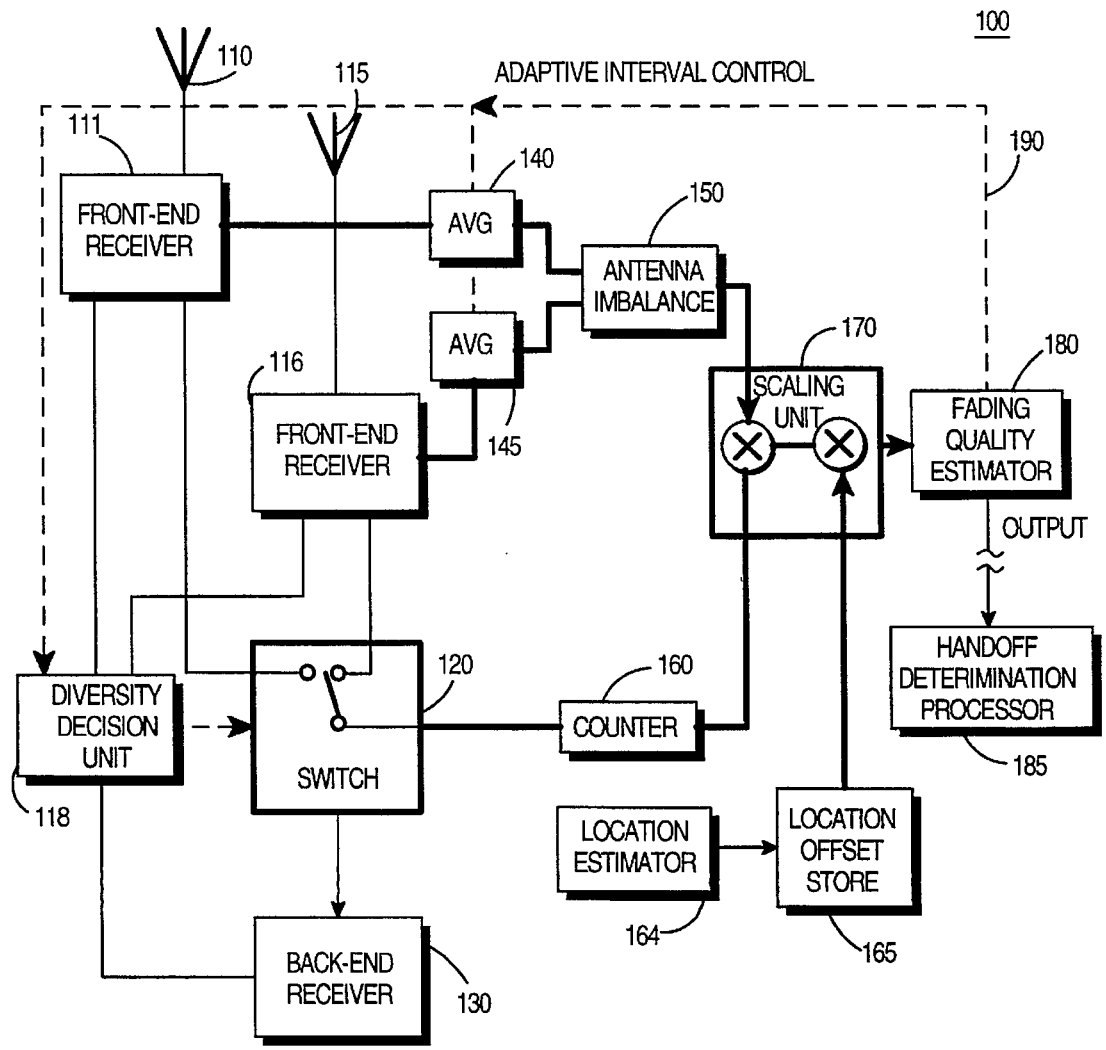
FIG. 3 is a block diagram of a communications unit illustrating a presently preferred embodiment of the present invention.

One skilled in the art will appreciate that while FIG. 3 illustrates a selection diversity implementation, the invention is also applicable to all diversity systems using plural antennas. Even if a particular diversity system does not already make best branch/antenna determinations, the invention can still be readily implemented, e.g., by the addition of some of the known circuitry and that described in FIG. 3 used for selection diversity decisions (i.e., omitting switch 120 but coupling counter 160 to a "decision" unit).

Although this apparatus and process is equally applicable to either a base station/controller or subscriber unit, the preferred embodiment will be described for a subscriber where branch imbalance is common (e.g., a portable communication unit held to the head of a user).

Turning now to FIG. 3, a block diagram is shown of a communications unit 100 for use in a wireless communication system including a fading quality estimator and two receiver branches and illustrating the principles embodying the present invention. Antennas 110 and 115 collect signals which fluctuate due to multipath fading. The two antennas generally collect dissimilar average powers due to differences in polarization or location. Both signals are fed to a back-end receiver 130, (e.g., including demodulator circuitry) through receiver front-ends 111, 116 and a diversity selection switch 120, which is used to switch in the best signal for each period $T_{div}$ based on a decision from unit 118 (which can be part of receiver 130 circuitry for some unit designs). Receiver front-ends 111 and 116 typically consist of filters, amplifiers, heterodyning, and detection. Circuitry 110, 111, 115, 116, 120, and 130 of FIG. 3 represent the basic elements of a selection diversity receiver. Averaging units 140 and 145 are typically present in a standard receiver to determine received signal strength (RSSI) for handoff and other decisions.

In general, it is desirable to adjust the averaging interval for blocks 140 and 145 to get accurate measures of RSSI (receive signal strength indication) under various conditions of multipath fluctuation. For example, at slow speeds a longer averaging interval is desired to obtain more reliable (constant) averages upon which to base decisions like handoff.

To implement this embodiment of the invention, a fading imbalance is calculated via branch imbalance estimator 150 by taking the difference between the two averages. The rate of change in imbalance is generally much slower than the multipath fluctuation. For instance, typical subscriber speeds are 0–5 kph (kilometers per hour) to 100 kph, resulting in tenths to hundredths of seconds between fades at cellular and PCS frequencies, while imbalances are expected to change on the order of seconds for the portable user who may turn his/her head or put down a portable communications unit.

Also, a diversity selection counter 160 counts the number of antenna transitions per second (or suitable period). A receiver encountering a slow rate of multipath changes under balanced-branch conditions, for instance, would tend to select one receive branch for many successive diversity periods ($T_{div}$) before switching to the other branch, resulting in a low count. Higher rates of multipath fluctuation, such as are encountered at high vehicular speeds, would cause one particular branch to be selected for fewer successive diversity periods since it is likely that branch superiority will alternate more quickly between the two antennas. The highest rate of antenna transitions would be $1/T_{div}$.

Figure 2:
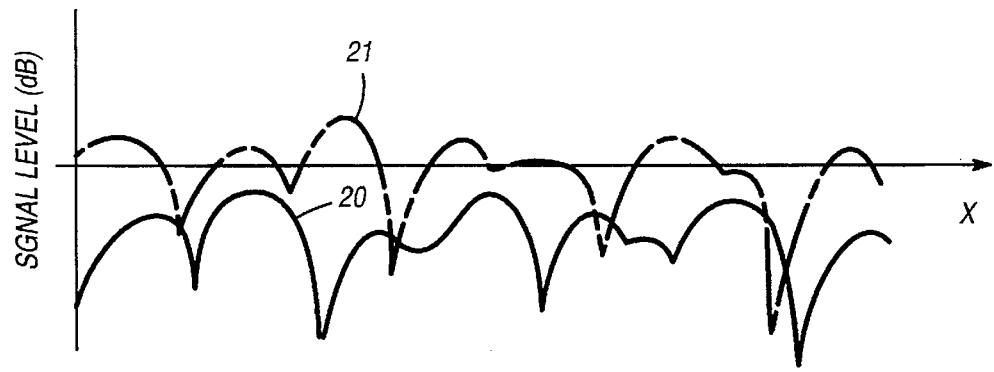
FIG. 2 is an illustrative prior art plot of Rayleigh fading signals illustrating typical signal levels recorded by two uncorrelated receiving antennas where the average power is not equal on each branch.

For the example of FIG. 1, which shows Rayleigh-faded signals collected by two separated (decorrelated) antennas, assuming a high (or continuous) sampling rate (small $T_{div}$), there are 13 transitions which occur after the first signal condition. For unbalanced conditions, fewer transitions will occur under the same multipath conditions, resulting in a lower apparent speed. In FIG. 2, the multipath conditions are the same as FIG. 1, but the inclusion of imbalance reduces the number of transitions from 13 to 8, giving a false estimation of fading characteristic (speed).

Using the scaling unit 170 of this embodiment, the number of antenna transitions is preferably combined with a measure of branch imbalance to provide, via fading quality estimator 180, a corrected estimate of apparent speed. For example, while fading quality estimator 180 in a simplest embodiment will only output the scaled count, in a first alternative it will use the scaled count to access a look-up table entry having the speed proportional to the scaled count, and output this speed; in yet another approach the scaled count can be compared to a prior or predetermined count to generate a difference factor, this factor being used as an output to adaptively control other circuitry such as averaging units 140 and 145.

The correction factor (scaling) is preferably determined by modeling the transition rate as a function of the imbalance and the rate of multipath for the radio and operating conditions of interest. The correction can be in the form of an equation, or look-up table, either of which can be readily designed by a skilled artisan. Further, the scaling function can be adaptive, being a function of other parameters, e.g., peak to average level of the fading as measured within the averaging blocks 140 and 145, etc. One may also include in scaling unit 170 a fading quality offset factor based on known fading characteristics of a known environment/ location, provided via location offset store 165 when accurate subscriber location information is available, e.g., from location estimator 164 (such as a GPS (Global Positioning System) receiver). Alternatively, where the location and speed are known by the subscriber, a comparison of the unscaled speed estimate output from fading quality estimator 180 with the actual/measured speed at a series of locations can be used to factor a series of fading quality offset factors per location determined, with the resulting table being used as a location offset store 165 for other subscribers. Control line (190) shows the adaptation of the averaging intervals based on the speed estimate or difference factor. This allows small changes to be made in the number of samples that are averaged to improve the estimate of the average power on each branch. This function is not necessary to the practice of the invention, but represents a useful option for further improvement to the communications unit 100.

Likewise, where communications unit 100 is a cellular base station (BS) and base site controller (BSC) the output of fading quality estimator 180 is preferably routed to a handoff determination processor 185 of the BS/BSC for use in altering hand-off parameters. For example, when the speed picks up for the subscriber, timing factors may be adjusted to more quickly handoff the subscriber into an adjacent cell or from a microcell to an overlay cell, etc. Finally, it should be apparent that many more uses of the fading quality estimator 180 output are possible, from simply providing speed information to a subscriber or infrastructure entity (such as a location register), to more complex adaptive changes to receiver parameters.

Figure 4:
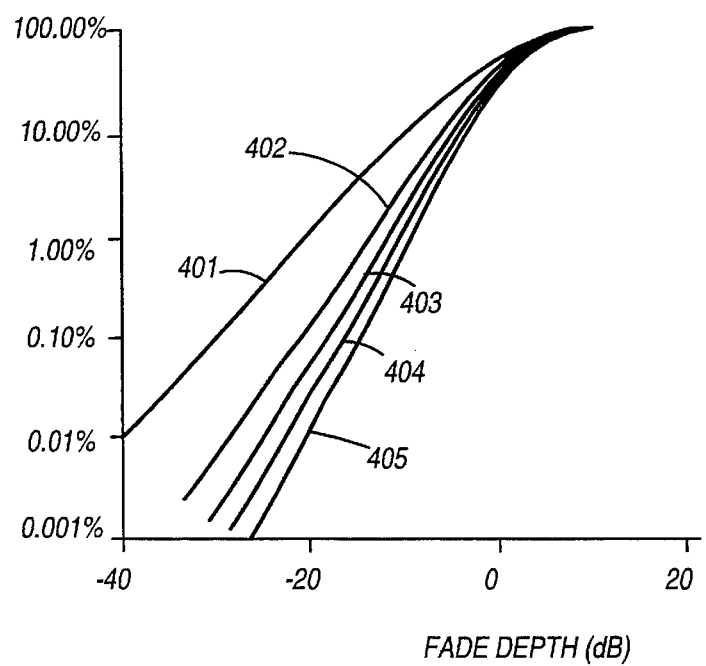
FIG. 4 is a plot illustrating the cumulative distribution of the fade depth of a Rayleigh fading process using selection diversity with varying levels of branch imbalance.

FIG. 4 illustrates the impact of diversity and imbalance on received signal quality. Received quality is measured in the percentage of time the receiver experiences, fades. Plot 401 is a single-branch receiver showing 20 dB fades 1% of the time. Plot 405 adds a second branch for selection diversity, which receives the same power as the first branch, resulting in fades 0.01% of the time. Plots 404, 403, and 402 show received quality for the second branch receiving reduced power by 3 dB, 6 dB, and 9 dB, respectively. The effect of this is that higher branch imbalances cause the diversity receiver to hold onto a given branch longer, which produces deeper fades, and slows down the number of antenna switches per second, thus degrading the estimator as seen in metric 510.

Figure 5:
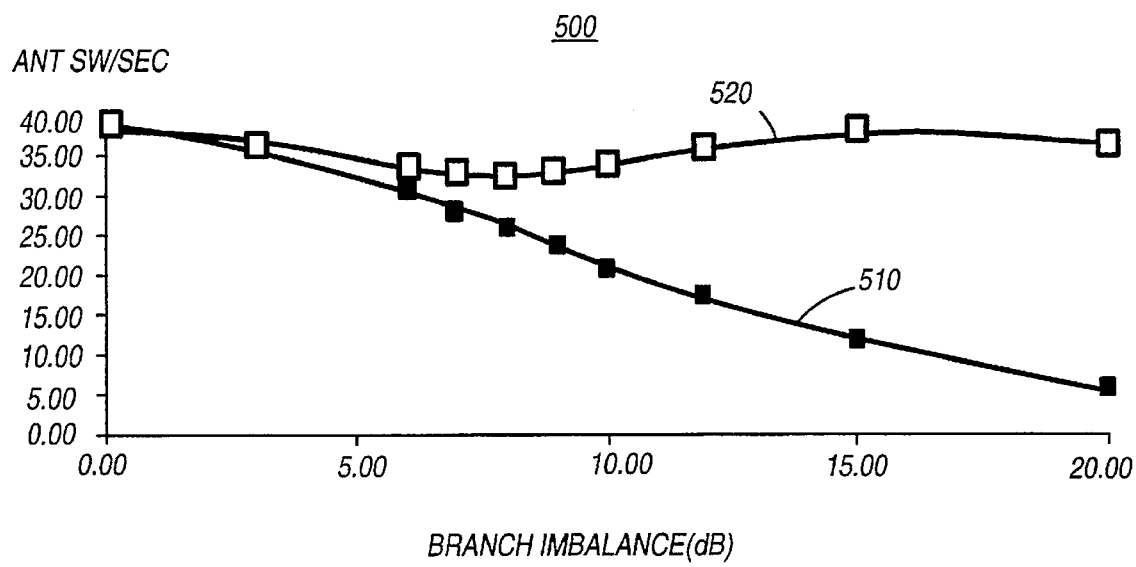
FIG. 5 is an exemplary graphic plot illustrating an improvement that can be obtained by use of the first embodiment.

FIG. 5 shows the improvement in fading "speed" obtained at 8 kph for various levels of branch imbalance by using the described fading quality estimator 180 of FIG. 3. A pseudo-selection TDMA diversity receiver is modeled where the antenna sampling occurs over two successive 250 µS (micro second) slots. At 8 kph under Rayleigh conditions, there are typically 35 mS (milliseconds) between fades at an RF frequency of 1.9 GHz, which is much longer than the sampling interval of 500 µS. Therefore, the modeled receiver approximates a selection diversity receiver. Plot 510 represents the number of antenna transitions per second; the apparent speed indicated by 510 deviates from the balanced count as imbalance is increased. Plot 520 shows the corrected count, for the above first embodiment of this invention, using a typical closed form scaling factor. The corrected count 520 shows substantial immunity to imbalance, giving an accurate estimation of fading speed. Demonstrating that a corrected count has a high immunity to branch imbalance is important to a practical fading quality estimator since the estimator should be able to distinguish between high and low rates of multipath fluctuation (speed). Note that the scaling calculation should typically include three input variables: counts per second, branch imbalance, and the rate of multipath fluctuation. The output of the scaling block is a corrected count that is immune to branch imbalance and is generally proportional to the apparent speed of the subscriber.

Figure 6:
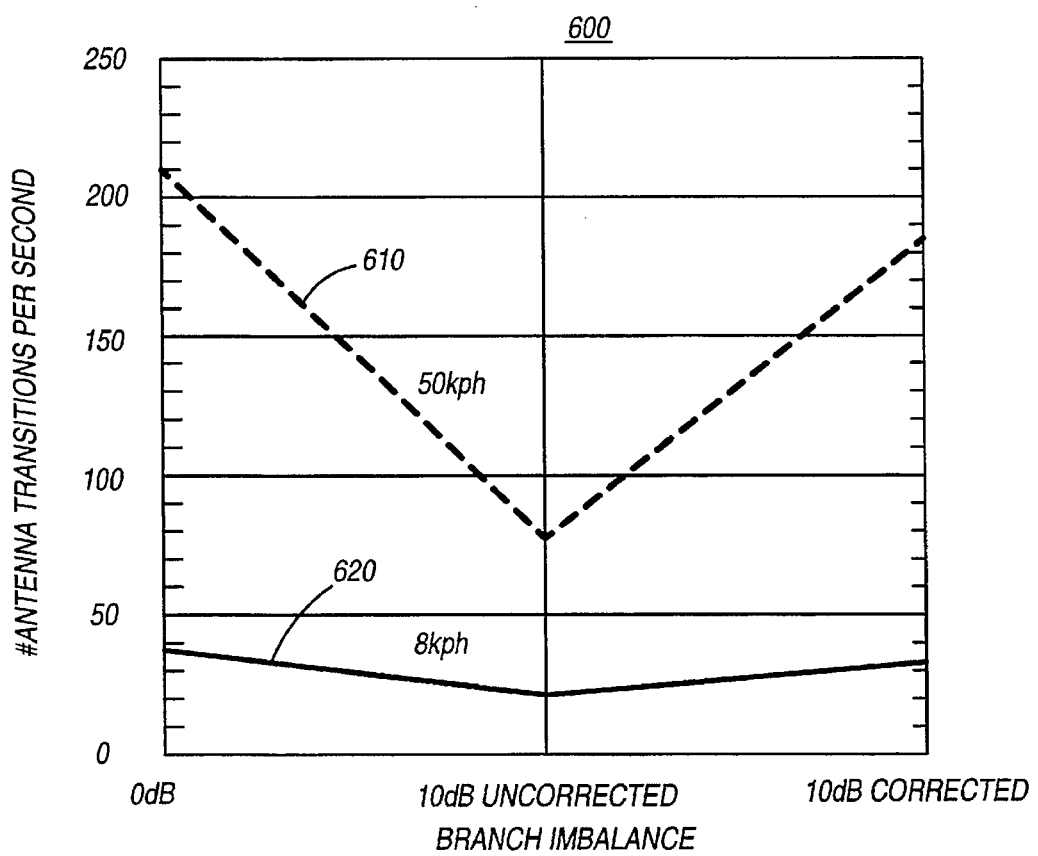
FIG. 6 is an exemplary graphic plot illustrating further improvement that can be obtained by use of the first embodiment.

FIG. 6 compares the corrected counts for two different apparent speeds under Rayleigh conditions using the described fading quality estimator. Using the same radio model described for FIG. 5, a 50 kph apparent speed is shown in plot 610 and a 8 kph apparent speed is shown in plot 620. In the first column (of the three conditions modeled), both branches are balanced, showing approximately a six-fold difference in the transition rate. Under branch imbalance, plots 610 and 620 show a drop in transition counts and a reduction in the ability to distinguish 8 kph from 50 kph. Note that there will be some randomness to the count over time which will cause further reduce the reliable gap between different apparent speeds. For the third condition, the counts diverge allowing a clearer decision on apparent speed.

Thus, it will be apparent to one skilled in the art that there has been provided in accordance with the invention, a method and apparatus for estimating a characteristic of a fading signal, including estimating subscriber speed based on such a characteristic, that fully satisfies the objectives and advantages set forth above. While the invention has been described in conjunction with specific embodiments thereof, it is evident that many alterations, modifications, and variations will be apparent to those skilled in the art in light of the foregoing description. Accordingly, the invention is intended to embrace all such alterations, modifications, and variations within the spirit and scope of the appended claims.

We claim:

1. A method of determining a characteristic of a fading signal in a communication unit having at least a first diversity branch including a first antenna and a second diversity branch including a second antenna, comprising the steps of:

(a) determining a first signal quality measure of the fading signal received by the first antenna, a second signal quality measure of the fading signal received by the second antenna, and a count of times that the first signal quality measure becomes greater than the second signal quality measure and that the second signal quality measure becomes greater than the first signal quality measure;

(b) determining, when the first and second branches are imbalanced, an imbalance measure between the first and second branches; and (c) determining the characteristic based on the count and, when the first and second branches are imbalanced, the imbalance measure.

2. The method of claim 1, wherein step (a) comprises:
(i) determining first amplitude estimates of the fading signal received by the first antenna, and second amplitude estimates of the fading signal received by the second antenna; and
(ii) comparing the first amplitude estimates and the second amplitude estimates to determine the count of times.

3. The method of claim 1, wherein the step of determining the count of times in step (a) comprises counting, for a predetermined time interval, each time an inactive branch is selected for use as an active branch.

4. The method of claim 1, wherein step (b) further comprises estimating a first branch average power and a second branch average power for a predetermined period, and determining the imbalance measure from the first and second branch average powers.

5. The method of claim 4, wherein step (c) further comprises determining a scaling factor from the imbalance measure, and determining the characteristic by multiplying the count and the scaling factor.

6. The method of claim 5, wherein the scaling factor is also determined based on peak to average fading levels of the first and second branch average powers.

7. The method of claim 1, wherein the fading signal is from a subscriber unit and the characteristic is fading quality measure indicative of the subscriber environment, further comprising:
(d) estimating a speed of the subscriber unit based on the fading quality measure.

8. The method of claim 7, wherein step (d) comprises estimating the speed of the subscriber unit based on the fading quality measure and an estimated fading quality offset.

9. The method of claim 1, wherein the fading signal is received at a subscriber unit, further comprising:
(d) estimating a speed of the subscriber unit based on the fading quality measure.

10. The method of claim 9, wherein step (d) further comprises estimating a fading quality offset for the location of the subscriber unit based on the fading quality measure and a known speed of the subscriber.

11. A communications unit in a wireless communication system having at least a first branch including a first antenna and a second branch including a second antenna adapted for diversity reception of a signal, comprising:
a diversity selection switch coupled to the first and second branches;
a diversity selection counter coupled to the diversity selection switch adapted for counting a number of times the diversity selection switch switches between the first and second branches;
a branch imbalance estimator, coupled to the first and second branches, adapted for determining an imbalance measure between the first and second branches; and
a fading quality estimator coupled to the branch imbalance estimator adapted for estimating a fading quality measure of the signal, wherein the fading quality estimator is further adapted for estimating the fading quality measure based on the number of times the diversity selection switch switches and the imbalance measure in a predetermined interval.

12. The communications unit of claim 11, wherein the communications unit is a subscriber unit receiving the signal from a cellular base station, and the fading quality measure is indicative of the subscriber unit speed, further comprising:
first and second averaging units coupled to the first and second branches, respectively, and to the branch imbalance estimator, each adapted for determining an average power for the first and second branches, respectively, for a predetermined interval; and the first and second averaging units are further coupled to the fading quality estimator and adapted for adaptively adjusting a period of the predetermined interval in response to the fading quality measure.

13. The communications unit of claim 11, wherein the communications unit is a cellular base station and controller receiving the signal from a subscriber unit, and the fading quality measure is indicative of the subscriber unit speed, further comprising:
a handoff determination processor coupled to the fading quality estimator, adapted for altering handoff parameters for the subscriber unit based on the fading quality measure.

14. The communications unit of claim 13
wherein the fading quality estimator further comprises a scaling unit coupled to the diversity selection counter and the branch imbalance estimator adapted for scaling the number of times the diversity selection switch switches by the imbalance measure.

15. The communication unit of claim 14, further comprising:
a location offset store coupled to the scaling unit and a location estimator adapted for outputting a fading quality offset for a known location, wherein the scaling unit is further adapted for scaling the number of times the diversity selection switch switches by the fading quality offset.

16. A method of estimating a speed of a communication unit from a fading signal received by a diversity receiver having at least a first diversity branch including a first antenna and a second diversity branch including a second antenna, comprising the steps of:
(a) determining a first signal quality measure of the fading signal received by the first antenna, a second signal quality measure of the fading signal received by the second antenna, and a count of times that the first signal quality measure becomes greater than the second signal quality measure and that the second signal quality measure becomes greater than the first signal quality measure;
(b) determining, when the first and second branches are imbalanced, an imbalance measure between the first and second branches; and
(c) estimating the speed based on the count and, when the first and second branches are imbalanced, the imbalance measure.

17. The method of claim 16, wherein the step of determining the count of times in step (a) comprises counting, for a predetermined time interval, each time an inactive branch is selected for use as an active branch.

18. The method of claim 16, wherein the diversity receiver is part of a base station and controller system, further comprising:
(d) adjusting a handoff parameter of the communication unit based on the speed estimated in step (c).

19. The method of claim 16, wherein the diversity receiver is part of the communication unit, further comprising:
(d) determining a fading quality offset for a known location by comparing the speed estimated in step (c) to a known speed of the subscriber unit.

* * * * *